United States Patent
Musa

[19]

[11] Patent Number: 6,016,349
[45] Date of Patent: Jan. 18, 2000

[54] CELLULAR PHONE PROVIDED WITH LEGAL IDENTIFICATION MEANS OF THE OWNER OF THE CELLULAR PHONE

[76] Inventor: Lorenzo Musa, Via Ugo Foscolo, 1, 15100 Alessandria, Italy

[21] Appl. No.: 08/768,383

[22] Filed: Dec. 18, 1996

[30] Foreign Application Priority Data

Dec. 20, 1995 [IT] Italy ................................. MI95A2693

[51] Int. Cl.⁷ ..................................................... H04K 1/00
[52] U.S. Cl. .............................. 380/23; 380/49; 380/247; 380/270; 455/410; 455/411
[58] Field of Search ............... 340/534, 825.04, 340/825.26–825.27, 825.33; 705/42; 902/2, 4, 5, 25, 26; 455/38.1, 74.1, 556–558, 403–435; 379/88.07–88.21, 91.01–93.23, 102.01–102.145, 204, 457; 380/4, 20, 24–30, 41, 59

[56] References Cited

U.S. PATENT DOCUMENTS

| | | | |
|---|---|---|---|
| 5,077,790 | 12/1991 | D'Amico | 380/23 |
| 5,239,294 | 8/1993 | Flanders et al. | 340/825.34 |
| 5,404,580 | 4/1995 | Simpson et al. | 455/89 |
| 5,457,737 | 10/1995 | Wen | 379/62 |
| 5,517,683 | 5/1996 | Collett et al. | 455/89 |
| 5,675,628 | 10/1997 | Hokkanen | 379/58 |
| 5,711,013 | 1/1998 | Collett et al. | 455/558 |
| 5,737,423 | 4/1998 | Manduley | 380/25 |
| 5,754,655 | 5/1998 | Hughes et al. | 380/24 |
| 5,793,866 | 8/1998 | Brown et al. | 380/2 |

FOREIGN PATENT DOCUMENTS

| | | | |
|---|---|---|---|
| 0 810 559 A2 | 3/1997 | Germany | 455/89 |
| 0 820 178 A2 | 1/1998 | United Kingdom | 455/89 |

*Primary Examiner*—Tod R. Swann
*Assistant Examiner*—Paul E. Callahan
*Attorney, Agent, or Firm*—Guido Modiano; Albert Josif

[57] ABSTRACT

A cellular phone including a central processing unit, receiving and transmitting means, and data input/output means, the phone comprising means for the legal identification of the owner of the cellular phone and data sending/receiving means, the identification means generating encrypted information relating to personal data that unequivocally identify the owner of the cellular phone for transmission, through the sending/receiving means, to a decryption and identification station.

10 Claims, 1 Drawing Sheet

CELLULAR PHONE PROVIDED WITH LEGAL IDENTIFICATION MEANS OF THE OWNER OF THE CELLULAR PHONE

BACKGROUND OF THE INVENTION

The present invention relates to a cellular phone provided with legal identification means of the owner of the cellular phone.

Cellular phones are currently becoming increasingly widespread and their operating scope is constantly expanding thanks to the use of the GSM technology.

Accordingly, the cellular phone is increasingly becoming a compact central unit whereto it is possible to connect, for example, a fax for sending or receiving documents and similar functions.

The possibility of performing, for example, telebanking operations by means of a cellular phone is conditioned by the need to unequivocally determine the identity of the person performing such operations, in order to ensure the usual security degree afforded by the physical presence of the person involved.

Likewise, there is an interest in being able to remotely perform all the operations that necessarily require the assured identification of the person or persons involved.

It is for example of considerable interest to be able to remote-control the activation/deactivation of devices and systems for "smart homes" and "smart vehicles" without the physical presence of the user.

Thus, for example, it would be advantageous to be able to remotely switch on or shutdown the independent heating system of a house by making a simple telephone call.

This possibility of remote interaction is currently not utilized since it is not possible to unequivocally identify a caller who uses a cellular phone.

SUMMARY OF THE INVENTION

A principal aim of the present invention is to provide a cellular phone having means for the legal identification of the owner of the cellular phone which allow to ensure the level of identification security normally afforded by the physical presence of the person.

Within the scope of this aim, an object of the present invention is to provide a cellular phone having means for the legal identification of the owner of the cellular phone which allow uniqueness and nonreproducibility of the identification data.

Another object of the present invention is to provide a cellular phone which allows to identify in advance the user who is making a call to said cellular phone.

A further object of the present invention is to provide a cellular phone which has means for the legal identification of the owner of the cellular phone and is highly reliable, relatively easy to manufacture, and at competitive costs.

This aim, these objects, and others which will become apparent hereinafter are achieved by a cellular phone comprising a central processing unit, receiving and transmitting means, and data input/output means, characterized in that it comprises means for the legal identification of the owner of said cellular phone and data sending/receiving means, said identification means generating encrypted information relating to personal data that unequivocally identify the owner of said cellular phone for transmission, through said sending/receiving means, to a decryption and identification station.

BRIEF DESCRIPTION OF THE DRAWINGS

Further characteristics and advantages of the invention will become apparert from the description of a preferred but non exclusive embodiment of the cellular phone according to the invention, illustrated only by way of non-limitative example in the accompanying drawings, wherein the only FIGURE is a block diagram of the elements that compose the cellular phone according to the invention.

DESCRIPTION OF THE PREFERRED EMBODIMENTS

Figure 1:
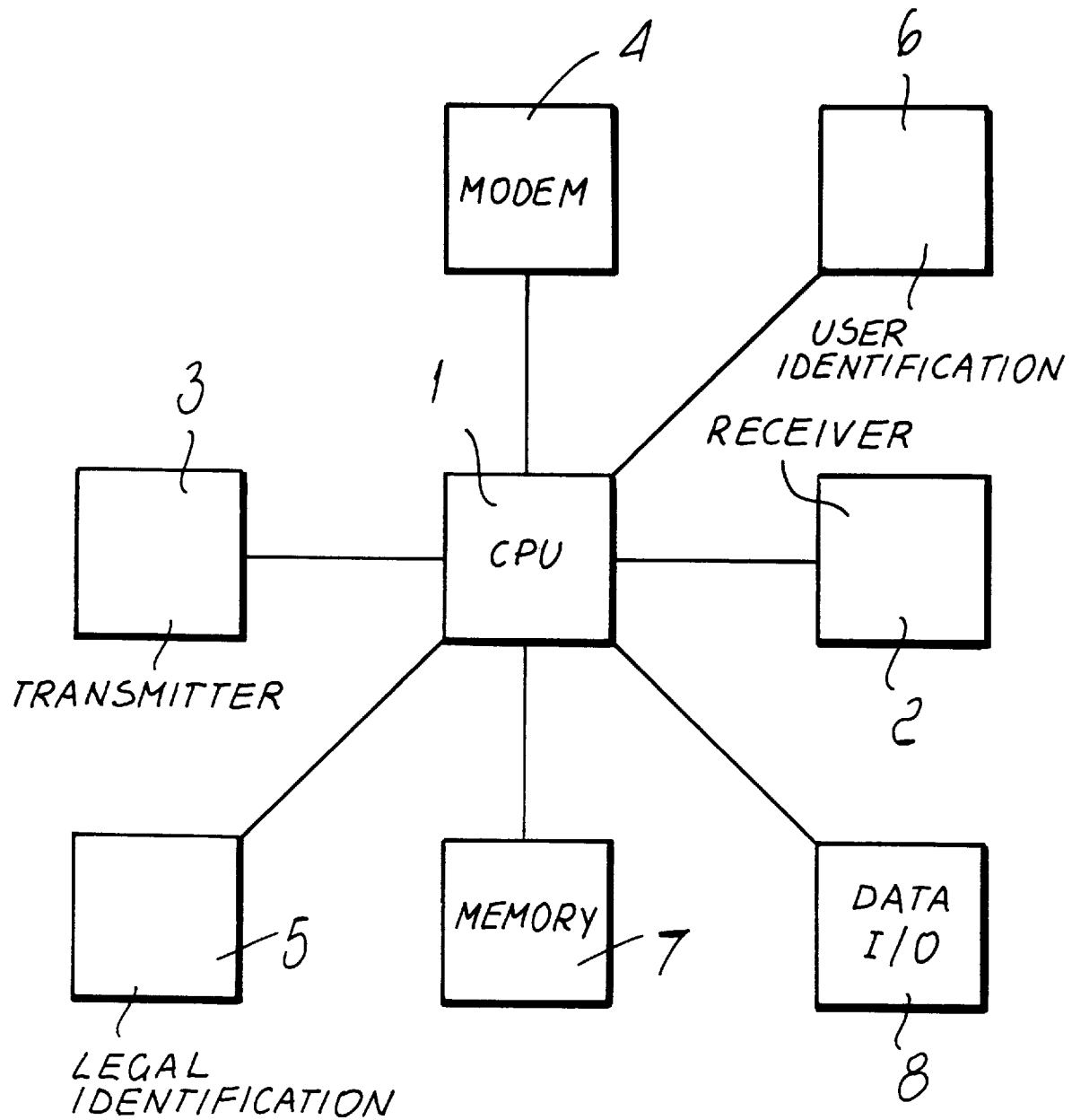

With reference to said only FIGURE, the cellular phone according to the invention comprises processing means which advantageously comprise a central processing unit 1 (CPU) adapted to control the various elements that constitute the cellular phone and are connected thereto.

In particular, the CPU 1 controls receiver means 2 and transmitter means 3 adapted to respectively receive and transmit communications signals, and modulation/demodulation means 4 adapted to send encrypted information generated by means 5 for the legal identification of the owner of said cellular phone and to receive information.

The legal identification means 5 comprise a so-called "audio smart card", which contains personal information regarding the user, such as his signature, fingerprints, voiceprint, etcetera, and is provided with a microprocessor that generates a time-variable algorithm for the encryption of the personal information, which is then sent by the modulation/demodulation means 4.

Advantageously, the audio smart card 5 and the modulation/demodulation means 4 are both provided on PCMCIA cards.

Accordingly, the smart card 5 can be inserted in the cellular phone, in an appropriate slot, at the time of use.

User identification means, conveniently constituted by a further card 6 controlled by the CPU 1, contain the telephone number of the cellular phone.

Memory means 7 and data input/output means 8 complete the cellular phone.

Advantageously, the data input means are constituted by an antenna and by a keyboard and the data output means are constituted for example by a liquid-crystal display and by said antenna.

With reference to said only FIGURE, operation of the cellular phone according to the invention is as follows.

Assume, for example, that a remote banking transaction has to be performed, such as an authorization for payment.

In this case, the user uses his cellular phone to call the bank, where the encrypted information that identifies the client and account holder who is calling with his cellular phone is stored.

The decryption and identification station provided in the bank requests the user to provide an identification code in order to authorize the intended operation to continue.

Said code is sent by the user by inserting the smart card 5 in the cellular phone, in a slot appropriately provided. In this manner, the smart card 5 transfers the encrypted information through the modulation/demodulation means 4 provided inside the cellular phone.

The encrypted information is generated by a time-variable algorithm produced by the microprocessor with which the smart card 5 is equipped, said algorithm ensuring the uniqueness and nonreproducibility of said information.

The decryption of said encrypted information occurs in the decryption and identification station of the bank.

If the information sent by the user by telephone matches the data stored in the decryption and identification station, user identification is confirmed and it is possible to continue performing the requested operation.

The algorithm used for encrypting the information is an algorithm currently used to protect the data transferred over banking networks.

It is of course possible to use any algorithm capable of allowing a high degree of data security.

The cellular phone provided with a card for the legal identification of the owner of said cellular phone allows to perform a plurality of remote operations, for example the activation/deactivation of devices and systems both in the home and industrial field and for transport vehicles.

It is also noted that it is possible to use the cellular phone according to the invention to access physical files, i.e., to obtain clearance to examine confidential documents for which data providing assured identification of the requesting person, such as for example the signature, are required. Once clearance has been obtained by telephone, the requested documents can be sent to the requesting person.

In practice it has been observed that the cellular phone according to the invention fully achieves the intended aim and objects, since it allows to perform the remote legal identification of the user who makes a telephone call by means of said cellular phone.

The information sent for identification is unique, cannot be reproduced, and is identifiable, with absolute confidence that it is being sent by its legitimate owner.

The uniqueness and nonreproducibility characteristics are ensured by the time-variable encryption algorithm generated by the microprocessor contained in the smart card 5.

The cellular phone thus conceived is susceptible of numerous modifications and variations, all of which are within the scope of the inventive concept.

Thus, for example, the cellular phone according to the invention can comprise an internal database, stored in the memory means 7, which allows advance identification of a user who calls said cellular phone. The display means 8 thus display said information to allow the receiving party to read it.

This identification occurs by comparing the data relating to the call being received with the pre-stored identification data of the users of interest, which are present in the memory means 7.

The means 5 for the legal identification of the owner of the cellular phone can also be entered permanently in said cellular phone. In this case, the activation of said means can occur by entering a secret code on the keyboard of said phone.

All the details may furthermore be replaced with other technically equivalent means.

In practice, the materials employed, so long as they are compatible with the specific use, as well as the dimensions, may be any according to the requirements and the state of the art.

What is claimed is:

1. A cellular phone comprising a central processing unit, receiving and transmitting means, and data input/output means, further comprising means for the legal identification of the owner of said cellular phone and data sending/receiving means, said identification means generating encrypted information relating to personal data that unequivocally identify the owner of said cellular phone for transmission, through said sending/receiving means, to a decryption and identification station, said means for the legal identification of the owner being actuatable only through a physical and unique feature of the legal owner of phone.

2. A cellular phone according to claim 1, wherein said means for the legal identification of the owner of said cellular phone comprise an audio smart card provided with a microprocessor, said card being insertable in said cellular phone and containing personal identification data of the owner of said cellular phone, said audio smart card being voice-activated only by the legal owner of the card.

3. A cellular phone according to claim 2, wherein said microprocessor included in said audio smart card generates an encryption algorithm for encrypting said personal data.

4. A cellular phone according to claim 3, wherein said encryption algorithm generated by said microprocessor of said smart card is a time-variable algorithm.

5. A cellular phone according to claim 1, wherein said sending/receiving means comprise modulation/demodulation means.

6. A cellular phone according to claim 1, wherein it comprises memory means adapted to store a database that contains information relating to users of interest to the owner of said cellular phone.

7. A cellular phone according to claim 1, wherein it comprises a card that contains the telephone number of said cellular phone.

8. A cellular phone according to claim 2, wherein said smart card is of the PCMCIA type.

9. A cellular phone according to claim 5, wherein said modulation/demodulation means are provided on a PCMCIA card, said card being insertable in said cellular phone.

10. A cellular phone according to claim 1, wherein said means for the legal identification of the owner of said cellular phone are permanently inserted in said phone, said means being activated by a secret numeric sequence entered by the user through the data input means of the digital telephone.

* * * * *